(12) United States Patent
Mathew et al.

(10) Patent No.: US 9,916,032 B2
(45) Date of Patent: Mar. 13, 2018

(54) SYSTEM AND METHOD OF KNOB OPERATION FOR TOUCHSCREEN DEVICES

(71) Applicant: HONEYWELL INTERNATIONAL INC., Morris Plains, NJ (US)

(72) Inventors: Sabu Mathew, Karnataka (IN); Sunil Sulania, Karnataka (IN); Nithin Ambika, Karnataka (IN); Ashwini Kshitij, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 79 days.

(21) Appl. No.: 15/157,520

(22) Filed: May 18, 2016

(65) Prior Publication Data

US 2017/0336901 A1  Nov. 23, 2017

(51) Int. Cl.
*G06F 3/041* (2006.01)
*G06F 3/0488* (2013.01)
*B64D 43/00* (2006.01)
*G08G 5/00* (2006.01)

(52) U.S. Cl.
CPC ............ *G06F 3/0416* (2013.01); *B64D 43/00* (2013.01); *G06F 3/0412* (2013.01); *G06F 3/04883* (2013.01); *G06F 3/04886* (2013.01); *G06F 2203/04104* (2013.01); *G08G 5/0086* (2013.01)

(58) Field of Classification Search
CPC .. G06F 3/0416; G06F 3/0412; G06F 3/04886; G06F 3/04883; G06F 2203/04104; B64D 43/00; G08G 5/0086
See application file for complete search history.

(56) References Cited

U.S. PATENT DOCUMENTS

| 7,088,343 | B2 | 8/2006 | Smith et al. |
| 8,441,460 | B2 | 5/2013 | Chang |
| 8,875,054 | B2 | 10/2014 | Hopkins et al. |

(Continued)

FOREIGN PATENT DOCUMENTS

EP  0961199 A1  12/1999

OTHER PUBLICATIONS

Extended EP Search Report for Application No. 17167171.2-1879 dated 20.07.17.

(Continued)

*Primary Examiner* — Jonathan Boyd
(74) *Attorney, Agent, or Firm* — Lorenz & Kopf, LLP

(57) ABSTRACT

A touchscreen display includes a first planar surface that comprises a first value-indicating virtual button showing a first value displayed in a first area of the first planar surface, a touch sensor operably coupled with the first planar surface, wherein the touch sensor is configured to detect a touch within the first area of the first planar surface, a second planar surface that is non-coplanar with respect to the first planar surface, the first and second planar surfaces forming a first common edge, a first swipe sensor operably coupled with the second planar surface, wherein the first swipe sensor is configured to detect a swiping motion in a first direction or in a second direction along the second planar surface, the second direction being opposite the first direction. The touchscreen display can be implemented in a vehicle, such as an aircraft.

20 Claims, 7 Drawing Sheets

(56) References Cited

U.S. PATENT DOCUMENTS

| | | | |
|---|---|---|---|
| 2009/0256809 A1* | 10/2009 | Minor | G06F 3/03547 345/173 |
| 2012/0226977 A1 | 9/2012 | Lengeling et al. | |
| 2013/0093689 A1 | 4/2013 | Papakipos et al. | |
| 2013/0207915 A1* | 8/2013 | Asai | H04N 1/00411 345/173 |
| 2013/0249814 A1 | 9/2013 | Zeng | |
| 2014/0240242 A1 | 8/2014 | Kawalkar et al. | |

OTHER PUBLICATIONS

Butler, A et al; Multi-"touch" interaction around small devices; UIST, 2008.

Purcher, J; Samsung invention points to new side and backside touch controls coming to future edge smartphones; Patently Mobile, 2015.

* cited by examiner

SYSTEM AND METHOD OF KNOB OPERATION FOR TOUCHSCREEN DEVICES

TECHNICAL FIELD

The exemplary embodiments described herein generally relate to touchscreen devices, and more particularly to a system and method of knob operation for touchscreen devices.

BACKGROUND

World wide air traffic is projected to double every ten to fourteen years and the International Civil Aviation Organization (ICAO) forecasts world air travel growth of five percent per annum until the year 2020. Such growth may have an influence on flight performance and may increase the workload of the flight crew. One such influence on flight performance has been the ability for the flight crew to input data while paying attention to other matters within and outside of the cockpit, especially during periods when movement makes it difficult to touch the panel in the desired manner or location. The ability to easily and quickly input data can significantly improve situational awareness of the flight crew.

Electronic displays have replaced traditional mechanical gauges and utilize computerized or electronic displays to graphically convey information related to various electronic systems associated with the electronic display. Traditional electronic displays often interfaced with a user via mechanical controls, such as knobs, buttons, or sliders, in order to enable a user to control or adjust various system properties. For example, if the electronic display is associated with a radio system, a user may adjust the frequency channel or volume level by rotating or otherwise utilizing a corresponding knob.

Many electronic devices, such as aircraft flight deck operational equipment, cursor control devices (CCDs), hard knobs, switches, and hardware keyboards, are increasingly being replaced by touch panels. A touch panel offers an intuitive input for a computer or other data processing devices, but may be affected by movement of the touch panel and/or the pilot caused by, for example, turbulence, aircraft vibration, and/or G forces.

With touchscreen displays heavily dominating the telecommunication and other user interface devices, it has become essential to upgrade avionics systems with touch-based interfaces to make use of new technological advances. It is relatively easier to replace other hardware buttons with touchscreen buttons as compared to knobs. Physical knobs are used to change values in a continuous or discrete manner (depending on the use case) by the virtue of their rotational motion. This motion is relatively difficult to replicate on touchscreen hardware. There have been many efforts to design a touch user interface that try to reproduce the same feedback as a physical knob.

For the safety of the flight it is also important that the user (pilot or crew) has the advantage of better ergonomics while operating the equipment. For avionics systems there are other factors which come into the picture, because safety is the highest priority. The virtual knobs on the touchscreen can be easily mishandled in the case of aircraft for example due to lack of stability, during the turbulence, during acceleration, or any manual inadvertent touch. This can have adverse effects on the safety of the aircraft, crew, and/or passengers.

Accordingly, it is desirable to provide improved flight screen display ergonomics, and it is desirable to provide improved flight screen display systems that reduce the incidence of mishandling, particularly during turbulence and accelerations. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

Touchscreen displays are disclosed in this application that are configured to improve flight screen display ergonomics and to improve the incidence of mishandling. In one exemplary embodiment, a touchscreen display including a first planar surface that comprises a first value-indicating virtual button showing a first value displayed in a first area of the first planar surface, a touch sensor operably coupled with the first planar surface, wherein the touch sensor is configured to detect a touch within the first area of the first planar surface, a second planar surface that is non-coplanar with respect to the first planar surface, the first and second planar surfaces forming a first common edge, and a first swipe sensor operably coupled with the second planar surface, wherein the first swipe sensor is configured to detect a swiping motion in a first direction or in a second direction along the second planar surface, the second direction being opposite the first direction. The touch sensor and the first swipe sensor are electronically and communicatively coupled with one another such that the first swipe sensor is configured to detect the swiping motion in the first or second direction while the touch sensor concurrently detects a touch, and to not detect the swiping motion in the first or second direction while the touch sensor concurrently does not detect a touch. Further, the first swipe sensor and the first planar surface are electronically and communicatively coupled with one another such that, while the touch sensor concurrently detects a touch in the first area, a detected swiping motion in the first direction causes the first value of the first value-indicating virtual button to increase and a detected swiping motion in the second direction causes the first value of the first value-indicating virtual button to decrease.

In another exemplary embodiment, a vehicle includes a value-determined vehicle system that operates on the basis of an input value and a touchscreen display. The touchscreen display includes a first planar surface that comprises a first value-indicating virtual button showing a first value displayed in a first area of the first planar surface, wherein the first value corresponds to the input value, a touch sensor operably coupled with the first planar surface, wherein the touch sensor is configured to detect a touch within the first area of the first planar surface, a second planar surface that is non-coplanar with respect to the first planar surface, the first and second planar surfaces forming a first common edge, and a first swipe sensor operably coupled with the second planar surface, wherein the first swipe sensor is configured to detect a swiping motion in a first direction or in a second direction along the second planar surface, the second direction being opposite the first direction. The touch sensor and the first swipe sensor are electronically and communicatively coupled with one another such that the first swipe sensor is configured to detect the swiping motion in the first or second direction while the touch sensor concurrently detects a touch, and to not detect the swiping motion in the first or second direction while the touch sensor concurrently does not detect a touch. The first swipe sensor and the first planar surface are electronically and communicatively coupled with one another such that, while the touch sensor concurrently detects a touch in the first area, a detected swiping motion in the first direction causes the first value of the first value-indicating virtual button to increase and a detected swiping motion in the second direction causes the first value of the first value-indicating virtual button to decrease. Further, the touchscreen display and the value-determined vehicle system are electronically and communicatively coupled with one another such that an increase or decrease in the first value causes a corresponding change in the input value and further causes a commensurate change in operation of the value-determined vehicle system on the basis of the change in the input value.

This brief summary is provided to describe select concepts in a simplified form that are further described in the Detailed Description. This brief summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
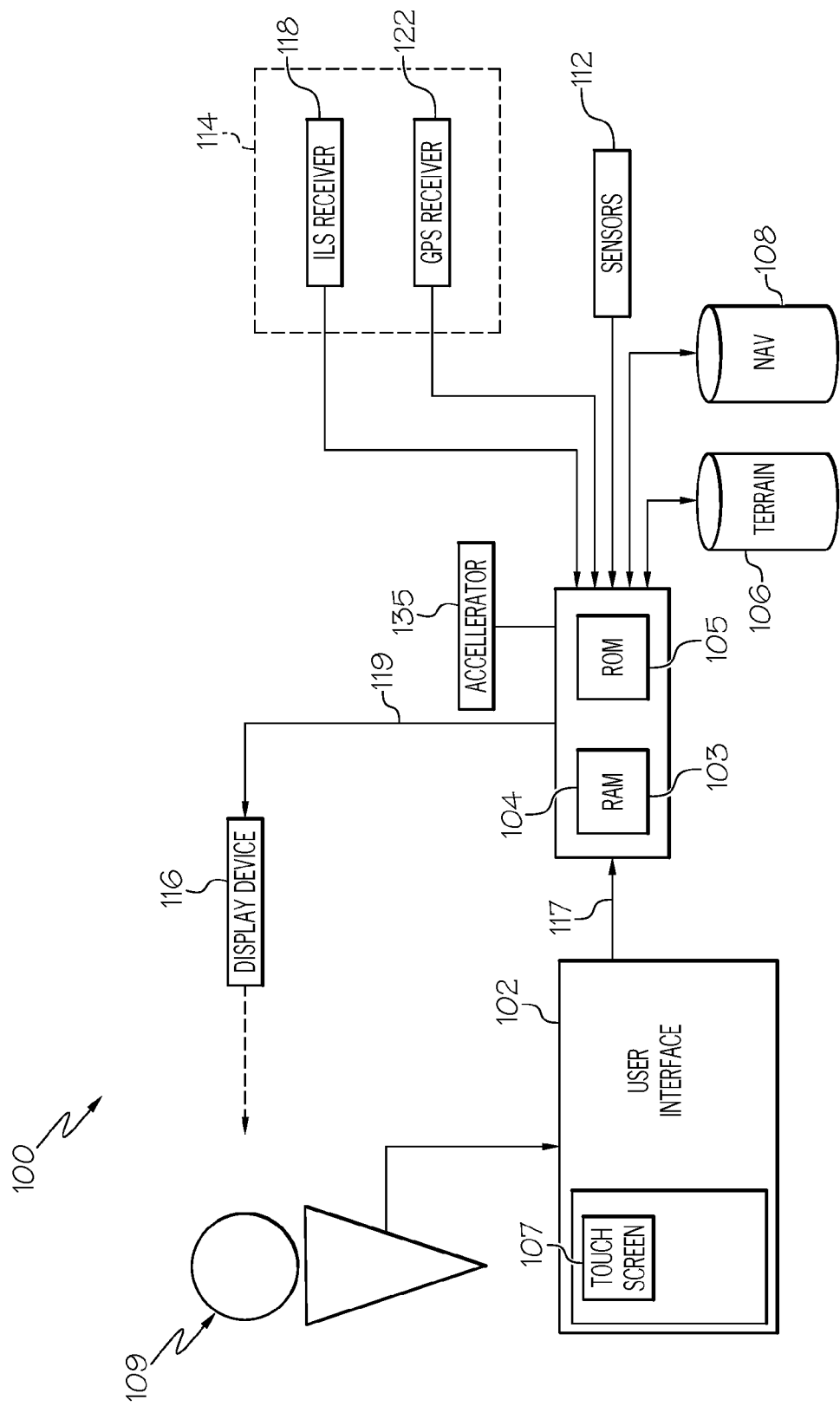
FIGS. 1-2 are system diagrams illustrative of the functions electronic and computing components of exemplary embodiments of the touchscreen displays of the present disclosure.

Though the method and touchscreen of the exemplary embodiments may be used in any type of electronic device, for example, vehicles and heavy machinery, and small handheld mobile devices such as smart phones, the use in an aircraft system is described as an example. Referring to FIG. 1 primarily, and also to FIG. 2, a flight deck display system 100 includes a user interface 102, a processor 104, one or more terrain databases 106 sometimes referred to as a Terrain Avoidance and Warning System (TAWS), one or more navigation databases 108, sensors 112, external data sources 114, and one or more display devices 116. The user interface 102 is in operable communication with the processor 104 and is configured to receive input from a user 109 (e.g., a pilot) and, in response to the user input, supplies command signals to the processor 104. The user interface 102 may be any one, or combination, of various known user interface devices including, but not limited to, one or more buttons, switches, or knobs (not shown). Some of these buttons, switches, or knobs may be virtualized by means of touchscreen 107. In the depicted embodiment, the user interface 102 includes the touchscreen 107, which periodically provides a controller signal 117 of the determination of a touch to the processor 104. The processor 104 interprets the controller signal 117, determines the application of the digit on the touchscreen 107, and provides, for example, a signal 119 to the display device 116. Therefore, the user 109 uses the touchscreen 107 to provide an input as more fully described hereinafter.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display system 100 might be realized using program code that is maintained in the memory 103, 105. For example, the memory 103, 105 can be used to store data utilized to support the operation of the display system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The terrain databases 106 include various types of data representative of the terrain over which the aircraft is flying, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, altitude, and attitude. The ILS 118 provides aircraft with horizontal (or localizer) and vertical (or glide slope) guidance just before and during landing and, at certain fixed points, indicates the distance to the reference point of landing on a particular runway. The GPS receiver 122 is a multi-channel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively render various textual, graphic, and/or iconic information, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat screen displays such as various types of LCD (liquid crystal display) and TFT (thin film transistor) displays. The display devices 116 may additionally be implemented as a screen mounted display, or any one of numerous known technologies. It is additionally noted that the display devices 116 may be configured as any one of numerous types of aircraft flight deck displays. For example, it may be configured as a multi-function display, a horizontal situation indicator, or a vertical situation indicator, just to name a few. In the depicted embodiment, however, one of the display devices 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein.

There are many types of touchscreen sensing technologies, including capacitive, resistive, infrared, surface acoustic wave, and embedded optical. All of these technologies sense touches on a screen. For example, U.S. Pat. No. 6,492,979 discloses the use of a combination of capacitive touchscreen and force sensors, U.S. Pat. No. 7,196,694 discloses the use of force sensors at the peripherals of the touchscreen to determine the position of a touch, and US patent publication 2007/0229464 discloses the use of a capacitive force sensor array, overlaying a display to form a touchscreen. Accordingly, the touchscreen 107 of the present disclosure may include touch sensors selected from the group consisting of resistive sensors, surface acoustic sensors, pulse acoustic sensors, capacitive sensors, infrared sensors, optical sensors, and piezoelectric sensors.

A touchscreen is disclosed having a plurality of buttons, switches, or knobs, each configured to display one or more symbols. A button, switch, or knob as used herein is a defined visible location on the touchscreen that encompasses the symbol(s). Symbols as used herein are defined to include alphanumeric characters, icons, signs, words, terms, and phrases, either alone or in combination. A particular symbol is selected by sensing the application (touch) of a digit, such as a finger or a stylus, to a touch-sensitive object associated with that symbol. A touch-sensitive object as used herein is a touch-sensitive location that includes a button and may extend around the button, switch, or knob. Each button, switch, or knob including a symbol has a touch-sensing object associated therewith for sensing the application of the digit or digits.

The present disclosure uses a technology which avoids the need of a virtual knob user interface (UI) by introducing two finger interaction with adjacent surfaces (e.g., front and side) of the touch screen panel. This provides a better grip to the user and increases the stability of the user input. It also provides a larger area for the user to provide swipe touch input as compared to any other virtual knob UI. The accidental touch is also relatively difficult to trigger since inputs of two fingers on the adjacent sides is simultaneously needed to generate an input feedback for the device.

In case of physical knobs primarily two types of knobs are used with first type being knob with one type of changes either continuous or discrete, second type has two different concentric knobs for separate coarse and fine changes. Two implementations have been provided in this disclosure which addresses both cases single change type knob and separate coarse fine change type knob.

Figure 3:
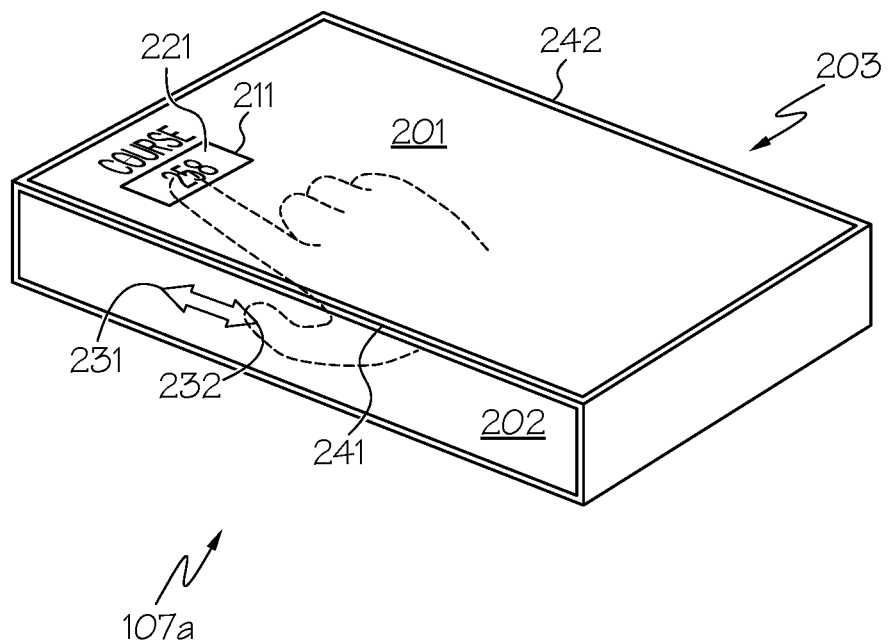
FIGS. 3-6 are touchscreen displays illustrative of a first embodiment.
Figure 4:
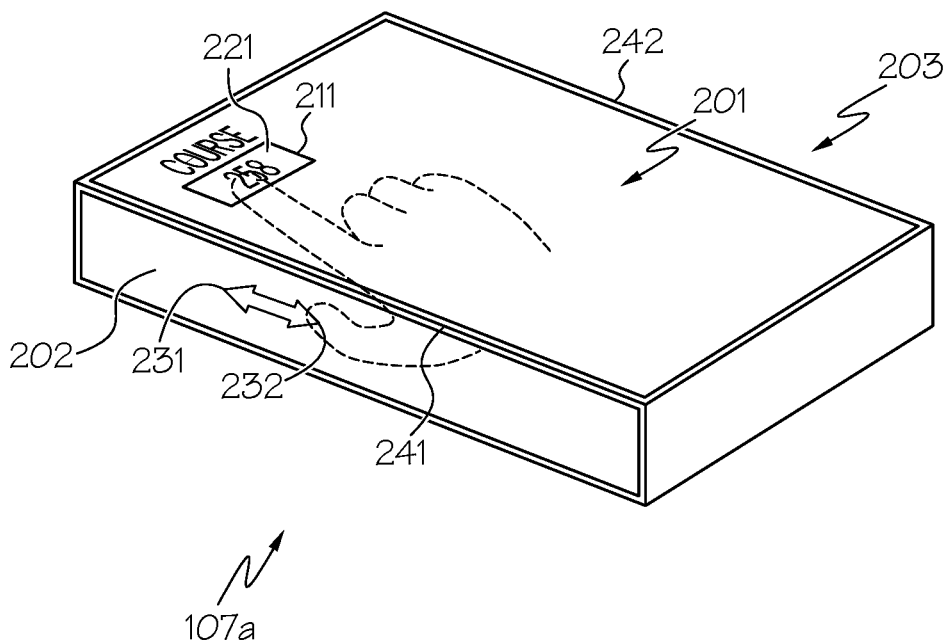
Figure 5:
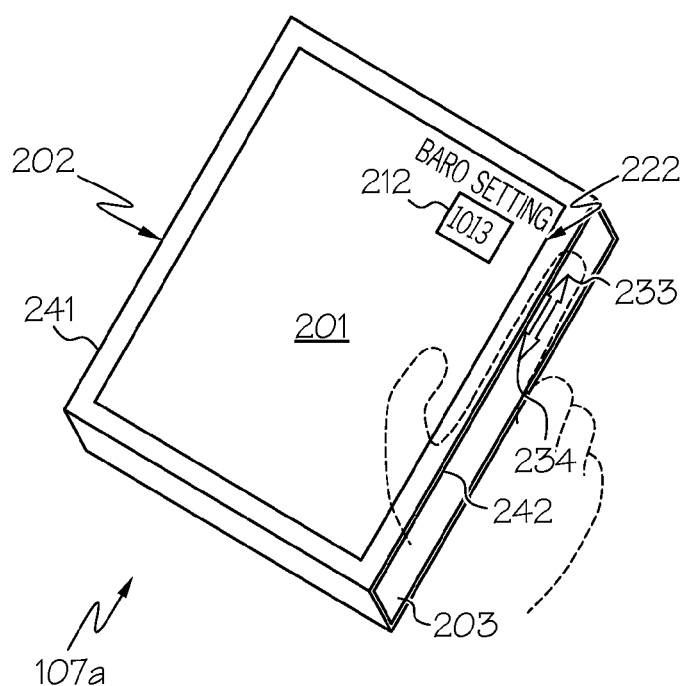
Figure 6:
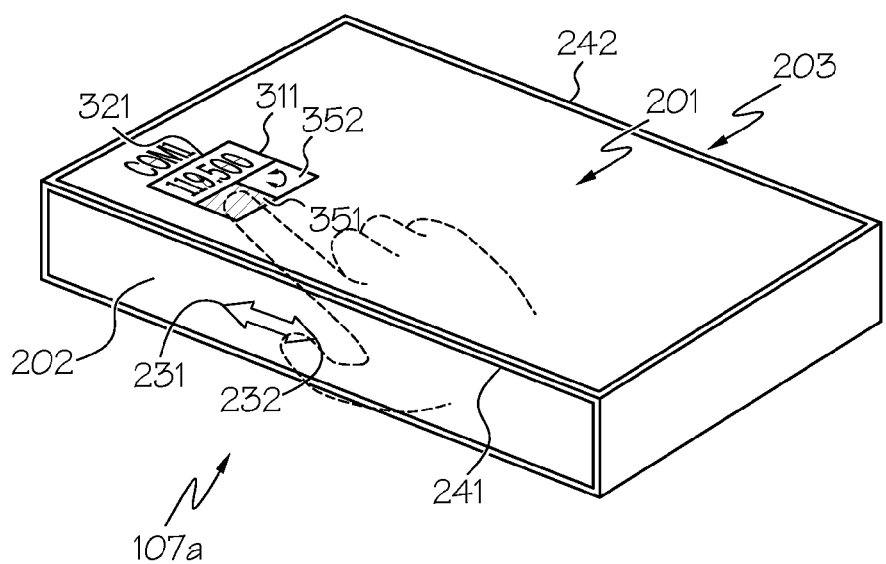

The first implementation is shown in FIGS. 3-5, as set forth in greater detail below. As shown, the first method replaces knob visualization completely, and to change some value related button should be touched and held, which activates the swipe input area and changes are made according to swipe motion. Further, an icon is displayed along with the value, the icon representing that the value is being modified. Changes being made can be shown either on same button or like a popup according to need of operation, and depending on how much area is being hidden under the finger. A general notion of swipe up to increase value and swipe down to decrease value can be used. For dedicated coarse and fine changes after the button is touched and held two options are displayed for coarse and fine changes respectively as shown in FIG. 6.

The acceleration and speed of finger swipe determines the difference in changes in values. The use case of device is not affected by whether the user (pilot) is left handed or right handed since the swipe scroll is present on both sides of the touch screen display panel and both type of swipe work similarly.

Figure 7:
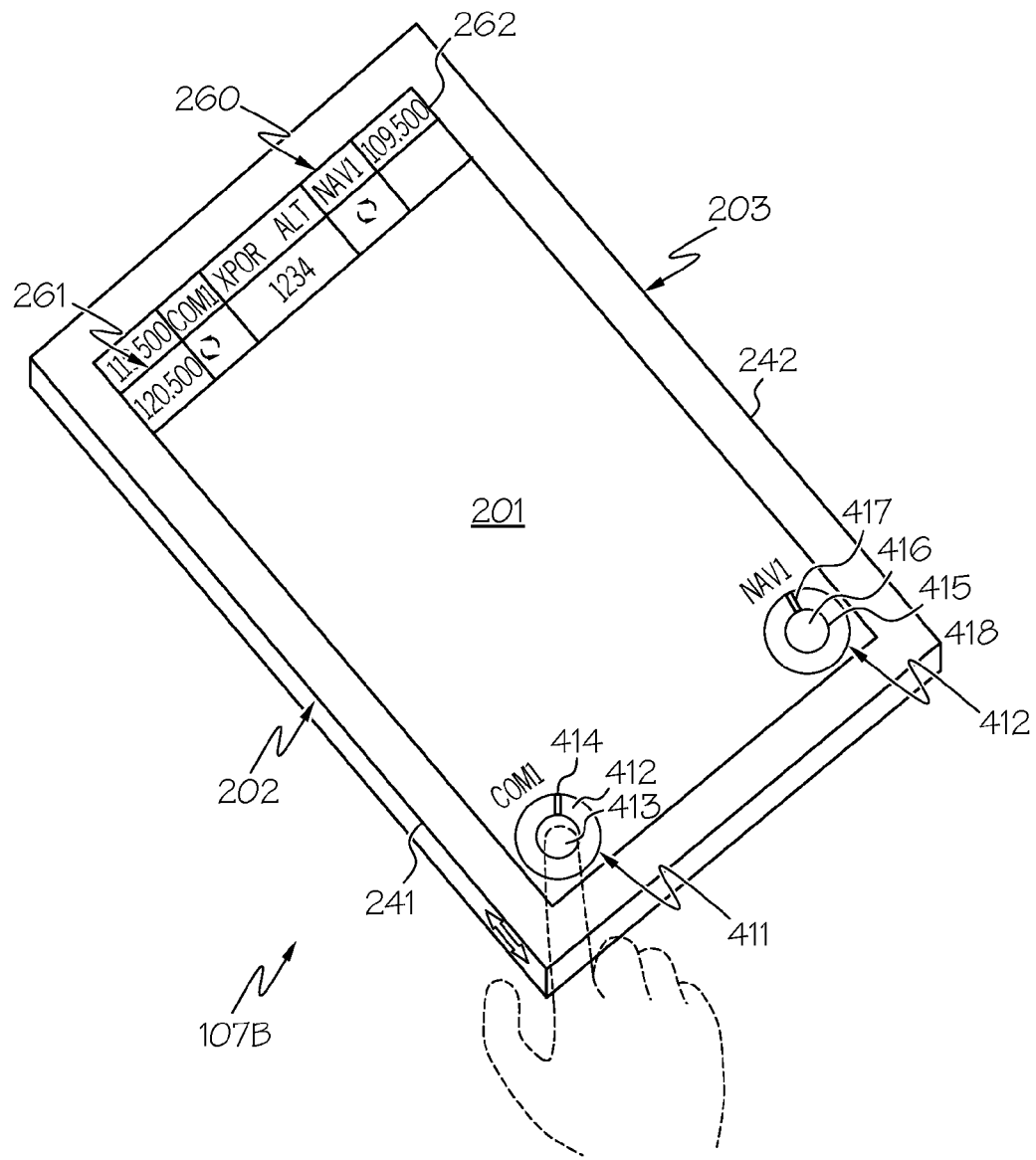
FIGS. 7-8 are touchscreen displays illustrative of a second embodiment.
Figure 8:
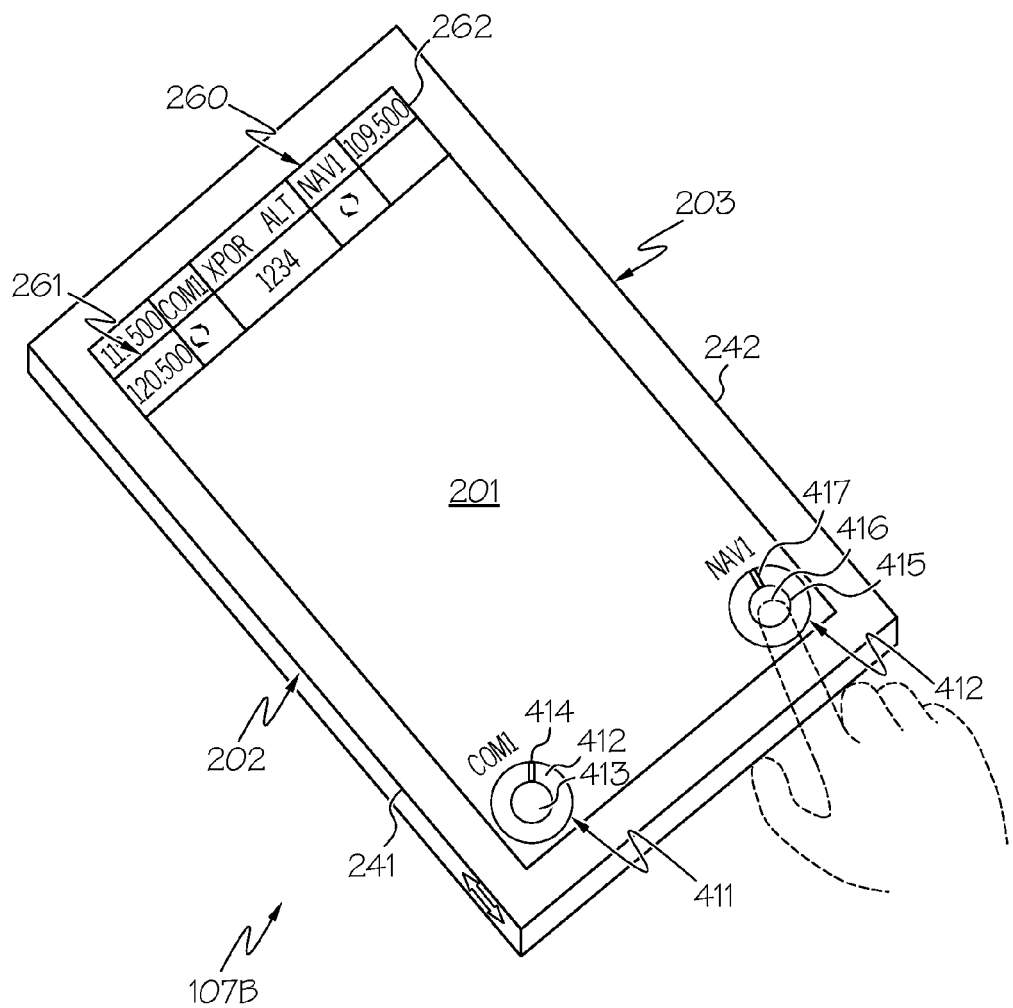

The second implementation is shown in FIGS. 7-8. For example, the second implementation uses common knobs for multiple values to be changed with visualization and feedback like a physical knob. When the knob is touched and held the swipe area becomes active with a symbol and the related value gets highlighted on touchscreen with name of value variable highlighted on top of knob as shown in FIGS. 7-8, to change the value the user swipes on the swipe area and as value changes, the knob also rotates to give feedback like a knob and/or to point to predefined target value. The coarse and fine knobs are proposed similar to physical concentric knobs. Similar to the first implementation disclosed above, it is ergonomically not dependent on users left/right handedness and the how fast the value changes is related to swipe input. For knobs with no separate coarse and fine requirements only one knob can be used similar to the explanation above.

Any of the implementations described above can be implemented on touchscreen displays by adding a scroll on sides of display panel using any one of the different touch technologies. To use the touch knob, first virtual knob button should be touched, which will activate the side scroll and make it available for swipe input including being highlighted with the symbol. Then the knob position can be adjusted using the swiping motion of one finger while keeping the knob button on the touch screen pressed by the other finger. Coarse and fine changes are differentiated with the speed and acceleration of swipe motion in the case of the first implementation, and with different concentric knobs in the case of the third implementation.

Figure 2:
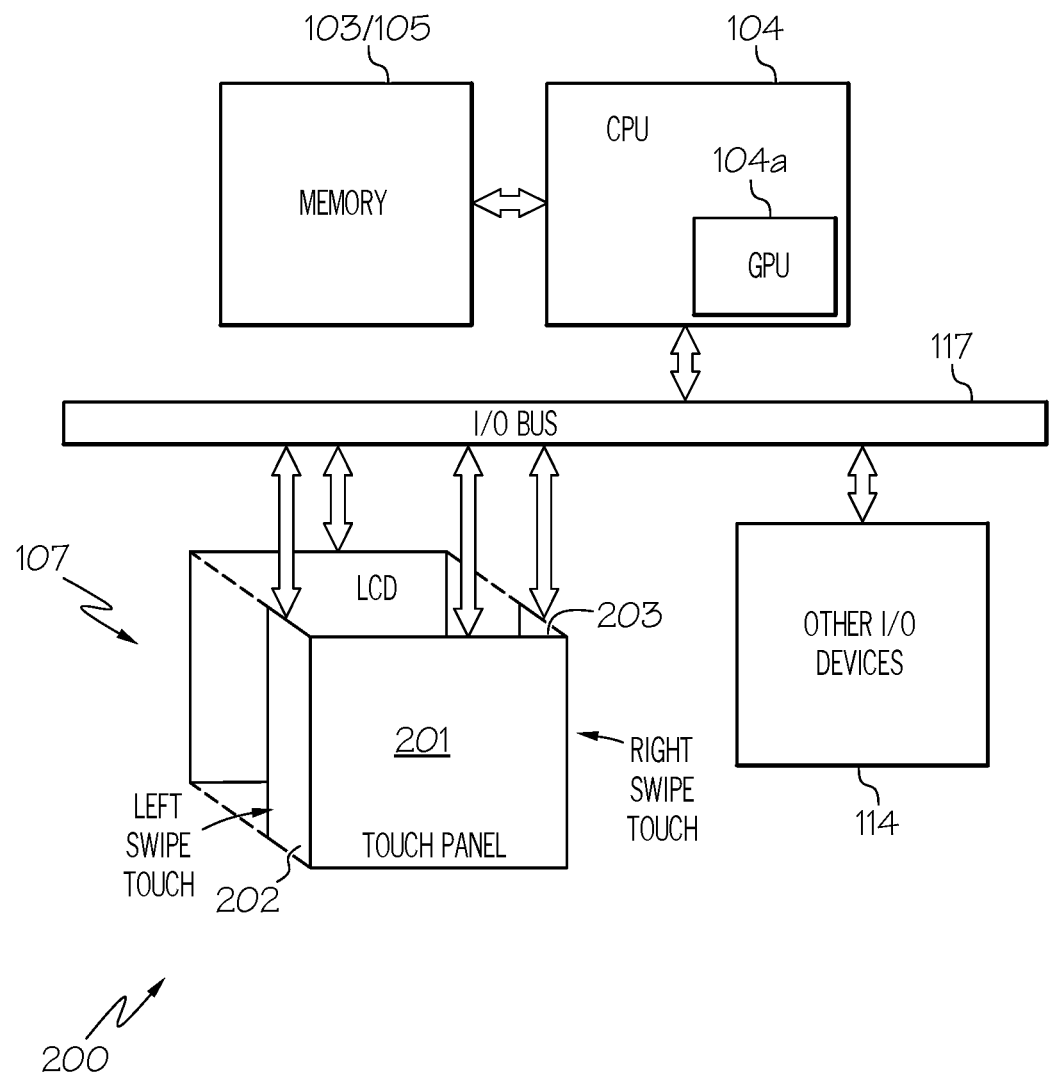

Referring now to FIG. 2 particularly, as well as FIGS. 3-6 generally, a more particular illustration 200 of the touchscreen 107 (the embodiment 107a of which is shown in FIGS. 3-6) in relation to the other vehicle electronics is provided. For example, as shown, touchscreen 107 includes a first planar surface 201 that can include a first value-indicating virtual button 211 showing a first value displayed in a first area 221 of the first planar surface 201. As noted above, the first planar surface 201 preferably includes a touch sensor operably coupled with the first planar surface 201, wherein the touch sensor is configured to detect a touch within the first area 221 of the first planar surface 201. Further, the touchscreen 107 includes a second planar surface 202 that is non-coplanar with respect to the first planar surface 201, the first and second planar surfaces 201, 202 forming a first common edge 241. A first swipe sensor is operably coupled with the second planar surface 202, and the first swipe sensor is configured to detect a swiping motion in a first direction 231 or in a second 232 direction along the second planar surface 202, the second direction 232 being opposite the first direction 231. Still further, the touchscreen 107 includes a third planar surface 203 that is non-coplanar with respect to the first planar surface 201, the first and third planar surfaces 201, 203 forming a second common edge 242. A second swipe sensor is operably coupled with the third planar surface 203, wherein the second swipe sensor is configured to detect a swiping motion in a third direction 233 or in a fourth direction 234 (see FIG. 5) along the third planar surface 203, the fourth direction 234 being opposite the third direction 233.

While the second and third planar surfaces 202, 203, are shown in the Figures as being on the left and right sides of the first planar surface 201, in other embodiments, it should be appreciated that the second planar surface 202 may be above or below the first planar surface 201, and independently, the third planar surface 203 may be above or below the first planar surface 201. Thus, the present disclosure should be understood as possibly including swipe sensors on any or all of the left, right, top, or bottom "side surfaces" (i.e., side with respect to the "top" first surface 201), in any combination, as may be deemed appropriate for a particular installation.

As used herein, the term non-coplanar means that in some embodiments, the first common edge 241 of the first and second planar surfaces 201, 202 forms an angle between the first and second planar surfaces 201, 202 of at least 20 degrees. In other embodiments, the first common edge 241 of the first and second planar surfaces 201, 202 forms an angle of 90 degrees+/−15 degrees. The same may be said for the second common edge 242, wherein in some embodiments, non-coplanar means an angle of at least 20 degree, and in other embodiments, non-coplanar means an angle of 90 degrees+/−15 degrees. Further, the first and second common edges 241, 242 may be substantially parallel to one another, which means that the first and second common edges 241, 242 are within +/−15 degrees of parallel with one another, and the first and second common edges 241, 242 being located on opposite sides of the first planar surface 201.

The touch sensor and the first swipe sensor are electronically and communicatively coupled with one another such that the first swipe sensor is configured to detect the swiping motion in the first or second direction 231, 232 while the touch sensor concurrently detects a touch, and to not detect the swiping motion in the first or second direction 231, 232 while the touch sensor concurrently does not detect a touch. This may be accomplished, as shown in FIGS. 3, 4, and 6, by the user 109 applying and maintaining the touch of a finger in the first area 221, while simultaneously applying another finger in a swiping motion at the second planar surface 202. The first swipe sensor and the first planar surface 201 are electronically and communicatively coupled with one another such that, while the touch sensor concurrently detects a touch in the first area 221, a detected swiping motion in the first direction 231 causes the first value of the first value-indicating virtual button 211 to increase and a detected swiping motion in the second direction 232 causes the first value of the first value-indicating virtual button 221 to decrease. Optionally, detecting the swiping motion in either the first or second direction 231, 232 (or the third or fourth direction 233, 234, as the case may be) causes a pop-up feature (not illustrated) to be displayed on the first planar surface 201, the pop-up feature displaying the first value of the first value-indicating virtual button 211.

In some embodiments, as shown in FIG. 5, the touchscreen 107 includes a second value-indicating virtual button 212 showing a second value displayed in a second area 222 of the first planar surface 201. The touch sensor is further configured to detect a touch within the second area 222 of the first planar surface 201. The first swipe sensor and the first planar surface 201 are electronically and communicatively coupled with one another such that, while the touch sensor concurrently detects a touch in the second area 222, a detected swiping motion in the first direction 231 (or third direction 233) causes the second value of the second value-indicating virtual button 212 to increase and a detected swiping motion in the second direction 232 (or fourth direction 242) causes the second value of the second value-indicating virtual button 212 to decrease. The touch sensor and the second swipe sensor are electronically and communicatively coupled with one another such that the second swipe sensor is configured to detect the swiping motion in the third or fourth direction 233, 234 while the touch sensor concurrently detects a touch, and to not detect the swiping motion in the third or fourth direction 233, 234 while the touch sensor concurrently does not detect a touch. This may be accomplished, as shown in FIG. 5, by the user 109 applying and maintaining the touch of a finger in the second area 22, while simultaneously applying another finger in a swiping motion at the second planar surface 203. The second swipe sensor and the first planar surface 201 are electronically and communicatively coupled with one another such that a detected swiping motion in the third direction 233 causes the second value of the second value-indicating virtual button 212 to increase and a detected swiping motion in the fourth direction 234 causes the second value of the second value-indicating virtual button 212 to decrease. In this regard, it should therefore be appreciated that the either the first or second swipe sensors can control either the first or second values of the respective first or second value-indicating virtual buttons 211, 212, depending on which area 221, 222 the user 109 touches on the first planar surface 201, and on which of the second or third planar surfaces 202, 203 the user 109 decides to swipe. Considerations of the user's left or right handedness, or the user's position with respect to the touchscreen 107, may be factors in this decision.

In some embodiments, the second and third planar surfaces 202, 203 are further configured to detect a rate of swiping, that is, how fast the user 109 moves a finger along such surface. The rate of swiping is proportional to a rate of change, either positive or negative, of the first value of the first value-indicating virtual button. Thus, for a relatively faster user swiping motion, the rate of change of the value (of either value-indicating virtual button 211, 212) is relatively faster. Conversely, for a relatively slower swiping motion, the rate of change of the value is relatively slower.

With reference particularly now to FIG. 6 (some reference numerals being incremented by 100 for clarity), in some embodiments, the first area 321 of the first planar surface 201 is divided into a first sub-area 351 and a second sub-area 352. The first sub-area 351 and the second sub-area 352 may be non-concentric with respect to one another. When either sub-area 351, 352 is touched, for a constant rate of swiping, the rate of change of the first value of the first value-indicating button 311 is faster for a concurrent touch detected in the first sub-area 351 relative to a concurrent touch detected in the second sub-area 352. In this regard, first sub-area 351 may be considered to be a "coarse" value adjustment, whereas second sub-area 352 may be considered to be a "fine" value adjustment.

Referring particularly now to the touchscreen embodiments 107b shown in FIGS. 7 and 8 (and with reference numerals incremented by a further 100 for clarity), the value-indicating virtual buttons 411, 418 can be made to appear as "knobs". In this manner, the second sub-area 413/416 is located concentrically within the first sub-area 412/415 such that the first/second value-indicating virtual buttons 411, 418 resemble a knob. Thus, when detecting the swiping motion in either the first or second direction 231, 232 (or the third or fourth direction 233, 234 as the case may be) causes the knob 411, 418 to appear to rotate (414, 417) clockwise for the first direction and anticlockwise for the second direction. Thus, the user 109 may be given the impression of the operation of at traditional knob, while still being virtualized on the touchscreen 107. As shown, this embodiment may also include a region 260 where the value of the virtual knobs are displayed for viewing by the user, value 261 corresponding with knob 411, and value 262 corresponding with knob 418.

As initially noted, the touchscreen 107 of the present disclosure may be implemented as part of any vehicle. An exemplary vehicle is an aircraft. As implemented the vehicle can include one or more value-determined vehicle systems than operate on the basis of an input value. Examples thereof, in the context of an aircraft, include communications systems, flight control systems, navigation systems, aircraft environment systems, and avionics systems, among others as will be appreciated by the person having ordinary skill in the art. Thus, the touchscreens of the present disclosure can be made to directly control vehicle/aircraft systems by the above-described touching/swiping actions of the user 109. For example, FIG. 3 shows the value-determined vehicle system being the autopilot course selection, wherein the touching/swiping actions can cause a change to the heading input of the autopilot, thereby causing the aircraft to change course. In another example, FIG. 5. Shows the value-determined vehicle system being the barometer setting of the aircraft, wherein the touching/swiping actions can cause a change to the aircraft's barometer setting, which in turn affects the displayed altitude. In yet another example, with reference to FIG. 6, the value-determined vehicle system is a communication radio, wherein the touching/swiping actions can cause the tuned frequency of the aircraft's communications radio to change. Accordingly, it should be appreciated that the touchscreen-displayed value of the value-indicating virtual button 211 corresponds to the input value of the value-determined vehicle system, and further that the touchscreen display 107 and the value-determined vehicle system are electronically and communicatively coupled with one another such that an increase or decrease in the touchscreen-displayed value of the value-indicating virtual button 211 causes a corresponding change in the input value of the value-determined vehicle system and further causes a commensurate change in operation of the value-determined vehicle system on the basis of the change in the input value, as described above.

Figure 9:
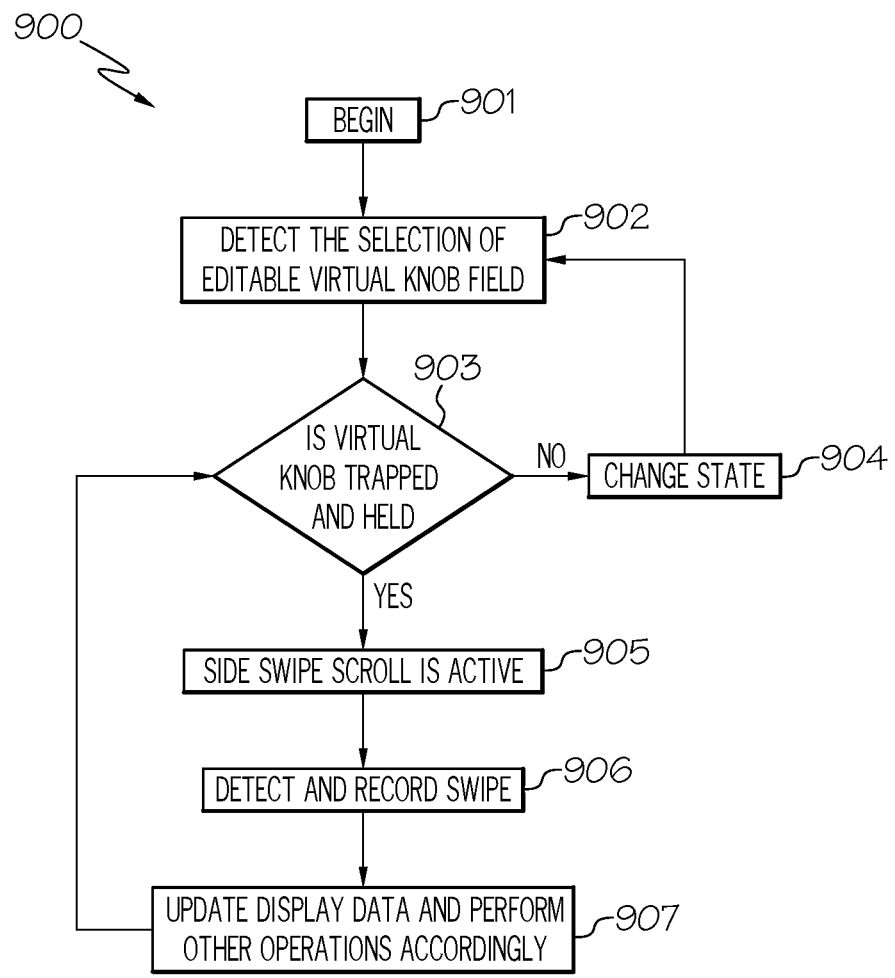
FIG. 9 is a method flow diagram illustrative of the operation of exemplary embodiments of the touchscreen displays of the present disclosure.

FIG. 9 provides a method flow diagram 900 illustrative of the operation of exemplary embodiments of the touchscreen displays of the present disclosure. The method 900 begins (901) and detects the section of an editable virtual knob field (902), such as first or second areas 221, 222. A determination (903) is made if the virtual knob is tapped and held. If no (904) some other operation may be performed on the knob, such as changing state. If yes (905), the method activates the first and second swipe sensors corresponding to second and third planar surfaces 202, 203. A swipe may then be detected and recorded (906). The touchscreen display 107 is then updated (907) according to the swipe (i.e., the value of the value-indicating virtual button is increased or decreased), and also, in the case of vehicle implementation, a commensurate change in operation of the value-determined vehicle system on the basis of the change in the input value is made. The method then reverts to step 903, and continues.

Accordingly, the present disclosure has disclosed improved touchscreen displays. These touchscreen displays provide improved flight screen display ergonomics. Additionally, these touchscreen displays provide improved flight screen display systems that reduce the incidence of mishandling, particularly during turbulence and accelerations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A touchscreen display comprising:
    a first planar surface that comprises a first value-indicating virtual button showing a first value displayed in a first area of the first planar surface;
    a touch sensor operably coupled with the first planar surface, wherein the touch sensor is configured to detect a touch within the first area of the first planar surface;
    a second planar surface that is non-coplanar with respect to the first planar surface, the first and second planar surfaces forming a first common edge;
    a first swipe sensor operably coupled with the second planar surface, wherein the first swipe sensor is configured to detect a swiping motion in a first direction or in a second direction along the second planar surface, the second direction being opposite the first direction,
    wherein the touch sensor and the first swipe sensor are electronically and communicatively coupled with one another such that the first swipe sensor is configured to detect the swiping motion in the first or second direction while the touch sensor concurrently detects a touch, and to not detect the swiping motion in the first or second direction while the touch sensor concurrently does not detect a touch,
    wherein the first swipe sensor and the first planar surface are electronically and communicatively coupled with one another such that, while the touch sensor concurrently detects a touch in the first area, a detected swiping motion in the first direction causes the first value of the first value-indicating virtual button to increase and a detected swiping motion in the second direction causes the first value of the first value-indicating virtual button to decrease, and
    wherein the first area of the first planar surface is divided into a first sub-area and a second sub-area, wherein, for a constant rate of swiping, the rate of change of the first value of the first value-indicating virtual button is faster for a concurrent touch detected in the first sub-area relative to a concurrent touch detected in the second sub-area.

2. The touchscreen display of claim 1, wherein the first common edge of the first and second planar surfaces forms an angle between the first and second planar surfaces of at least 20 degrees.

3. The touchscreen display of claim 1, wherein the first common edge of the first and second planar surfaces forms an angle of 90 degrees+/−15 degrees.

4. The touchscreen display of claim 1, further comprising:
    a third planar surface that is non-coplanar with respect to the first planar surface, the first and third planar surfaces forming a second common edge;
    a second swipe sensor operably coupled with the third planar surface, wherein the second swipe sensor is configured to detect a swiping motion in a third direction or in a fourth direction along the third planar surface, the fourth direction being opposite the third direction,
    wherein the touch sensor and the second swipe sensor are electronically and communicatively coupled with one another such that the second swipe sensor is configured to detect the swiping motion in the third or fourth direction while the touch sensor concurrently detects a touch, and to not detect the swiping motion in the third or fourth direction while the touch sensor concurrently does not detect a touch, and
    wherein the second swipe sensor and the first planar surface are electronically and communicatively coupled with one another such that a detected swiping motion in the third direction causes the first value of the first value-indicating virtual button to increase and a detected swiping motion in the fourth direction causes the first value of the first value-indicating virtual button to decrease.

5. The touchscreen display of claim 4, wherein the second and third planar surfaces are within +/−15 degrees of coplanarity with one another.

6. The touchscreen display of claim 4, wherein the first and second common edges are within +/−15 degrees of parallel with one another, and wherein the first and second common edges are located on opposite sides of the first planar surface.

7. The touchscreen display of claim 1, wherein the second planar surface is further configured to detect a rate of swiping, and wherein the rate of swiping is proportional to a rate of change, either positive or negative, of the first value of the first value-indicating virtual button.

8. The touchscreen display of claim 1, wherein the first sub-area and the second sub-area are non-concentric with respect to one another.

9. The touchscreen display of claim 8, wherein detecting the swiping motion in either the first or second direction causes a pop-up feature to be displayed on the first planar surface, the pop-up feature displaying the first value of the first value-indicating virtual button.

10. The touchscreen display of claim 1, wherein the second sub-area is located concentrically within the first sub-area such that the first value-indicating virtual button resembles a knob.

11. The touchscreen display of claim 10, wherein detecting the swiping motion in either the first or second direction causes the knob to appear to rotate clockwise for the first direction and anticlockwise for the second direction.

12. The touchscreen display of claim 1, further comprising a second value-indicating virtual button showing a second value displayed in a second area of the first planar surface, wherein the touch sensor is further configured to detect a touch within the second area of the first planar surface, and wherein the first swipe sensor and the first planar surface are electronically and communicatively coupled with one another such that, while the touch sensor concurrently detects a touch in the second area, a detected swiping motion in the first direction causes the second value of the second value-indicating virtual button to increase and a detected swiping motion in the second direction causes the second value of the second value-indicating virtual button to decrease.

13. The touchscreen display of claim 1, wherein the touch sensor and the swipe sensor are each independently selected from the group consisting of: resistive sensors, surface acoustic sensors, pulse acoustic sensors, capacitive sensors, infrared sensors, optical sensors, and piezoelectric sensors.

14. A vehicle comprising:
a value-determined vehicle system than operates on the basis of an input value; and
a touchscreen display, wherein the touchscreen display comprises:
a first planar surface that comprises a first value-indicating virtual button showing a first value displayed in a first area of the first planar surface, wherein the first value corresponds to the input value;
a touch sensor operably coupled with the first planar surface, wherein the touch sensor is configured to detect a touch within the first area of the first planar surface;
a second planar surface that is non-coplanar with respect to the first planar surface, the first and second planar surfaces forming a first common edge;
a first swipe sensor operably coupled with the second planar surface, wherein the first swipe sensor is configured to detect a swiping motion in a first direction or in a second direction along the second planar surface, the second direction being opposite the first direction,
wherein the touch sensor and the first swipe sensor are electronically and communicatively coupled with one another such that the first swipe sensor is configured to detect the swiping motion in the first or second direction while the touch sensor concurrently detects a touch, and to not detect the swiping motion in the first or second direction while the touch sensor concurrently does not detect a touch, and
wherein the first swipe sensor and the first planar surface are electronically and communicatively coupled with one another such that, while the touch sensor concurrently detects a touch in the first area, a detected swiping motion in the first direction causes the first value of the first value-indicating virtual button to increase and a detected swiping motion in the second direction causes the first value of the first value-indicating virtual button to decrease,
wherein the first area of the first planar surface is divided into a first sub-area and a second sub-area, wherein, for a constant rate of swiping, the rate of change of the first value of the first value-indicating virtual button is faster for a concurrent touch detected in the first sub-area relative to a concurrent touch detected in the second sub-area, and
wherein the touchscreen display and the value-determined vehicle system are electronically and communicatively coupled with one another such that an increase or decrease in the first value causes a corresponding change in the input value and further causes a commensurate change in operation of the value-determined vehicle system on the basis of the change in the input value.

15. The vehicle of claim 14, wherein the first common edge of the first and second planar surfaces forms an angle between the first and second planar surfaces of at least 20 degrees.

16. The vehicle of claim 14, wherein the touchscreen display further comprises:
a third planar surface that is non-coplanar with respect to the first planar surface, the first and third planar surfaces forming a second common edge;
a second swipe sensor operably coupled with the third planar surface, wherein the second swipe sensor is configured to detect a swiping motion in a third direction or in a fourth direction along the third planar surface, the fourth direction being opposite the third direction,
wherein the touch sensor and the second swipe sensor are electronically and communicatively coupled with one another such that the second swipe sensor is configured to detect the swiping motion in the third or fourth direction while the touch sensor concurrently detects a touch, and to not detect the swiping motion in the third or fourth direction while the touch sensor concurrently does not detect a touch, and
wherein the second swipe sensor and the first planar surface are electronically and communicatively coupled with one another such that a detected swiping motion in the third direction causes the first value of the first value-indicating virtual button to increase and a detected swiping motion in the fourth direction causes the first value of the first value-indicating virtual button to decrease.

17. The vehicle of claim 14, wherein the touchscreen display further comprises a second value-indicating virtual button showing a second value displayed in a second area of the first planar surface, wherein the touch sensor is further configured to detect a touch within the second area of the first planar surface, and wherein the first swipe sensor and the first planar surface are electronically and communicatively coupled with one another such that, while the touch sensor concurrently detects a touch in the second area, a detected swiping motion in the first direction causes the second value of the second value-indicating virtual button to increase and a detected swiping motion in the second direction causes the second value of the second value-indicating virtual button to decrease.

18. The vehicle of claim 14, wherein the touch sensor and the swipe sensor are each independently selected from the group consisting of: resistive sensors, surface acoustic sensors, pulse acoustic sensors, capacitive sensors, infrared sensors, optical sensors, and piezoelectric sensors.

19. The vehicle of claim 14, wherein the vehicle comprises an aircraft, and wherein the value-determined vehicle system is selected from the group consisting of: communications systems, flight control systems, navigation systems, aircraft environment systems, and avionics systems.

20. The vehicle of claim 14, wherein the second planar surface is further configured to detect a rate of swiping, and wherein the rate of swiping is proportional to a rate of change, either positive or negative, of the first value of the first value-indicating virtual button.

* * * * *